June 30, 1959     YEE LAIN CHEW     2,892,577

CARRIER FOR CYCLES OR THE LIKE

Filed Oct. 23, 1957

INVENTOR
YEE LAIN CHEW
BY *Emory L. Groff*
ATTORNEY 2,892,577

CARRIER FOR CYCLES OR THE LIKE

Yee Lain Chew, Perak, Malaya

Application October 23, 1957, Serial No. 691,846

Claims priority, application Great Britain March 19, 1957

3 Claims. (Cl. 224—31)

The present invention relates to a carrier for cycles or the like.

According to the present invention there is provided a carrier for cycles or the like which comprises a load carrying member or platform and means for supporting same in its normal position of use, and means connecting said member to the supporting means which permits bodily displacement of the member from said normal position to a secondary position in which it serves as a protective cover for the cycle saddle.

By means of the present invention it will be readily appreciated that when a cycle is left in the open the carrier can be moved into a position in which it covers the saddle so as to protect same against rain, sun and dust.

As is made clear hereinafter the carrier can be manipulated quickly and easily to set it in either of its two alternative positions.

To enable the invention to be clearly understood an embodiment thereof will now be described by way of example, with reference to the accompanying drawings, wherein.

Figure 1:
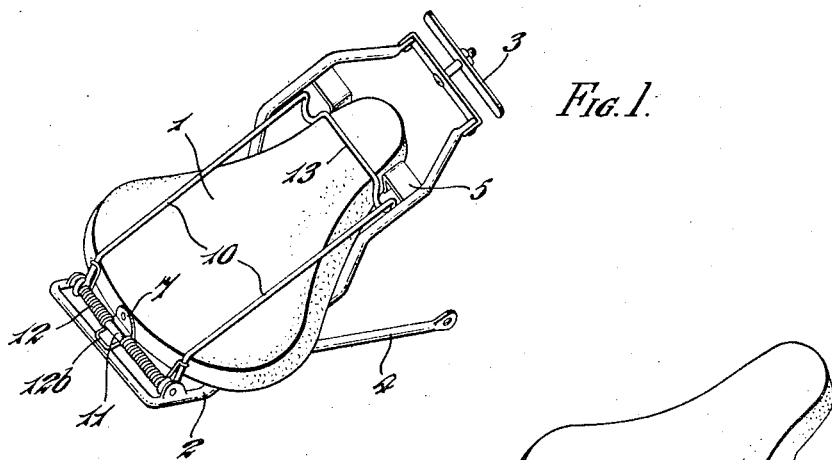
Figure 1 is a perspective view showing the carrier in its normal load-supporting position.

Referring to the drawings, the carrier proper comprises a substantially flat load-supporting surface 1 and is itself normally supported by a horizontally disposed U-shape frame 2 adapted at its forward free ends for connection to a rear wheel fork of the cycle, e.g., by a clamp 3, and the side limbs are supported adjacent their rear ends by struts 4 adapted either to be connected to the rear wheel axle or to a lower part of said forks. Approximately the rear half of said frame is cranked downwardly so that in side elevation the rear part 2a of the frame is a very shallow U configuration.

The side limbs of the U-shape supporting frame are bridged adjacent their front ends by a transverse frame member 5 which is bent between its ends to form a depending U-shape cradle 5a in which the forward end of the carrier platform 1 can engage, the rear part of the platform being of increased width so that it projects laterally beyond the U-shape portions 2a of the side limbs and rests therein so that the platform is firmly supported.

The rear end of the platform 1 is hinged at 7 to the closed end of the U-shape rod 6 having its parallel limbs extending forwardly beneath the platform and the forward ends are bent laterally at 8 and are pivotally supported in slotted bearing portions 9 at the rear of the transverse cradle 5a connected between the front ends of the supporting frame 2. So far it will now be appreciated that the platform 1 can be swung upwardly and forwardly bodily to a horizontal position in which it will overlie the seat of the saddle.

Figure 2:
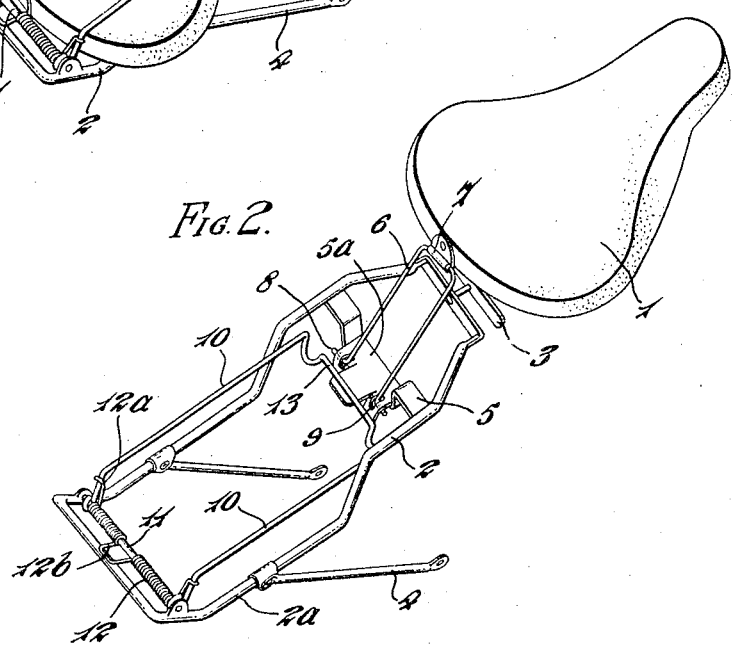
Figure 2 is a perspective view showing the carrier raised and extended so as to cover the cycle saddle.

A locking device is provided for maintaining the platform 1 against its supporting frame 2 and this device comprises two rods 10 which extend lengthways of the carrier and are looped at their rear ends and mounted on a spindle 11 which extends transversely across the rear end of the frame member 2 and this spindle 11 is fitted with a torsion spring 12 which is adapted at its ends 12a to act on the rear end of each rod and between its ends shaped at 12b to engage the rear cross member of the frame 2. The forward ends of these two rods 10 are connected by a cross member 13 which, when the platform 1 is raised as shown in Figure 2 engages the rear part of the cradle 5a. When the platform 1 has been raised to a saddle covering position shown in Figure 3, it may, if desired, be adjusted vertically from the full line position to the dotted position to suit the height of the saddle. This is possible because the limbs of the U-shape rod 6 can slide freely through the slots 9.

Preferably, the platform 1 resembles the shape of the saddle in plan view and is made slightly larger than the saddle so as to extend completely thereover and is formed with a depending flange which surrounds the side edges of the saddle to give complete protection thereto.

Figure 3:
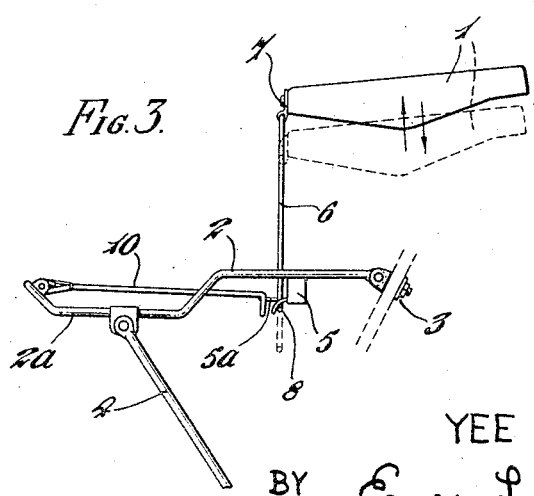
Figure 3 is a side elevation showing the carrier in the position illustrated in Figure 2.

From the foregoing it will be appreciated that the present invention provides a cycle carrier which can either be used as such or swung to the raised portion shown in Figures 2 and 3 to provide a protective covering for the saddle of the cycle. When used in its normal position when it rests on the frame 2 the spring urged rods 10 can be used as a means for holding a parcel or any other article urged tightly against the platform 1 so that the parcel is held securely in position.

When carrying articles of a nature which cannot easily be clamped against a flat surface, the platform 1 can be inverted so as to present a dish-shaped carrier with its side flanges directed upwards so that said flanges act to prevent the carried article rolling off the platform. The locking rods with the platform arranged in this manner would still serve to hold the article in position.

In order to invert the platform 1, the limbs of the U-shaped rod are withdrawn from the slots 9, and the direction in which the platform points reversed, so that when the platform is swung into a horizontal position on top of the U-shape rod, its dish-shaped underside is facing upwards.

I claim:

1. A device for protecting a cycle saddle against the weather comprising a dish-like cover having a shape which is complementary to that of the saddle, a support frame, means on said support frame for connecting the latter to the cycle frame behind and at a lower level than the saddle, a member hinged at one end to a forwardly disposed part of the support frame and at its other end to the rear end of the cover, whereby the cover can be swung upwardly and forwardly from a horizontal position in which it rests on the support frame to a raised horizontal position in which it covers the top and side edges of the saddle, said support frame comprising side members having rear portions of shallow U configuration for supporting the rear and wider part of the cover, and also comprising forward raised portions bridged by a transverse member shaped to form a depending cradle in which the forward end of the cover can rest, and a spring-loaded clamping device connected to the rear of the support frame and adapted to bear against the cover when the latter rests on the support frame or against any article placed thereon.

2. A device according to claim 1, wherein the member connecting the cover to the support frame is a U-shape rod having its closed end hinged to the rear of the cover and the free ends of its side limbs engaged in slots in said depending cradle so as to be slidable through said slots to permit vertical adjustment of the cover when in a saddle-covering position.

3. A device for protecting a cycle saddle against the weather comprising a dish-like cover having a shape which is complementary to that of the saddle, a support frame, means on said support frame for connecting the latter to the cycle frame behind and at a lower level than the saddle, a U-shape rod having its closed end hinged to the rear of the cover and the free ends of its side limbs engaged through slots in a depending transverse cradle at the forward end of the support frame whereby the cover can be swung upwardly and forwardly from a horizontal position in which it rests on the support frame to a raised horizontal position in which it covers the top and side edges of the saddle, said support frame comprising side members having rear portions of shallow U configuration for supporting the rear and wider part of the cover with the forward end of the cover supported by said transverse cradle, and a spring-loaded clamping device connected to the rear of the support frame and adapted to bear against the cover when the latter rests on the support frame or against any article placed thereon.

References Cited in the file of this patent

UNITED STATES PATENTS

| | | |
|---|---|---|
| 965,093 | Fentress | July 19, 1910 |
| 1,004,975 | Blackman | Oct. 3, 1911 |

FOREIGN PATENTS

| | | |
|---|---|---|
| 66,174 | Denmark | Jan. 5, 1948 |
| 415,558 | Great Britain | Aug. 30, 1934 |
| 450,824 | Italy | Aug. 13, 1949 |
| 576,679 | Germany | May 15, 1933 |
| 1,075,506 | France | Apr. 14, 1954 |